Oct. 28, 1930.　　　　　E. R. DYE　　　　　1,779,907
DEVICE FOR LOCATING PUNCTURES IN AUTOMOBILE TIRES
Filed March 10, 1928
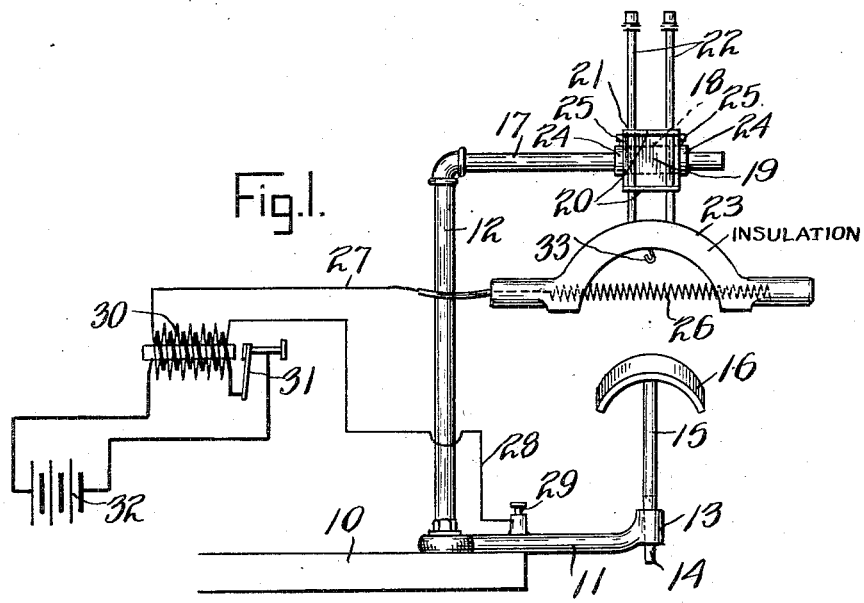
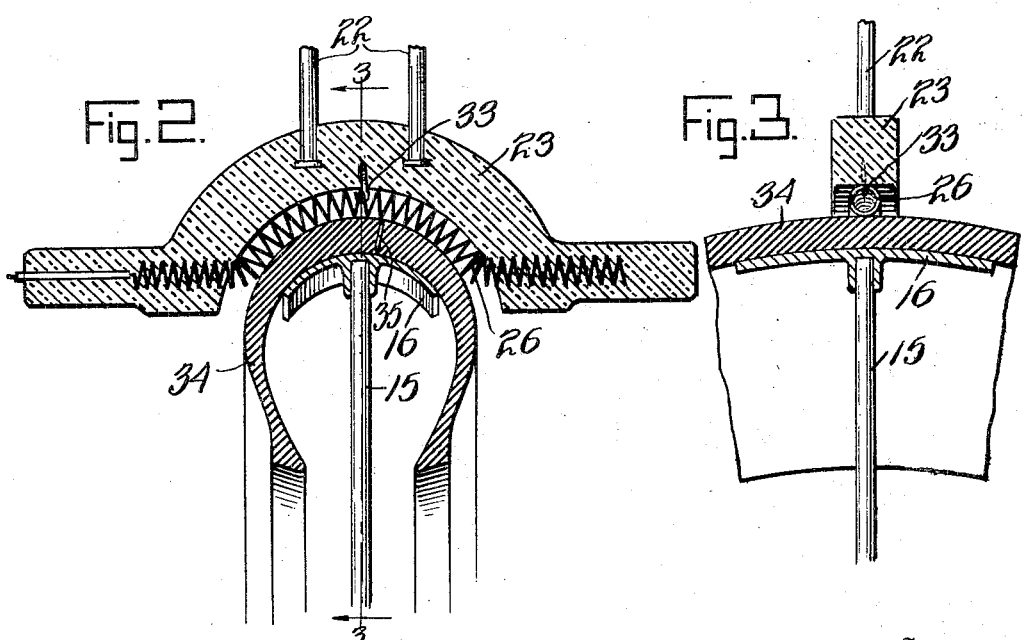
Inventor
Edward R. Dye
By Ẅ Bradford
Attorney Patented Oct. 28, 1930

1,779,907

UNITED STATES PATENT OFFICE

EDWARD R. DYE, OF MONTICELLO, INDIANA

DEVICE FOR LOCATING PUNCTURES IN AUTOMOBILE TIRES

Application filed March 10, 1928. Serial No. 260,766.

My invention relates to a device for locating punctures in automobile tires and by means of which nails, tacks, pieces of wire, or other metallic substances and also holes in the tire may be easily located.

Referring to the accompanying drawings which are made a part hereof and on which similar reference characters indicate similar parts, Figure 1 is a front elevation of a device illustrating one application of my invention, Figure 2, a transverse section showing the manner of locating a nail in a tire, and Figure 3, a section on the line 3—3 of Fig. 2.

In the drawings reference character 10 indicates a support which may be a stool, table, bench, or the like upon which are mounted a bracket 11 and a post 12. The bracket 11 has a polygonal tapered socket 13 at its outer end for the reception of the tapered end 14 of a post 15 on the upper end of which is mounted a longitudinally and transversely curved tire engaging shoe 16. The shoe 16 is preferably formed of steel or other good conductor of electricity for a purpose hereinafter more fully described. Also shoes of various sizes may be used if desired.

The post 12 is provided with a horizontal arm 17 upon which is rotatably mounted a sleeve 18. On the sleeve 18 is mounted a body 19 having spaced parallel flanges 20 provided with spaced parallel openings 21 for the reception of rods 22 which are secured at their lower ends in a curved outer shoe 23 formed of insulating material. The sleeve 18 may be provided with set screws by means of which it may be secured in any position desired. Collars 24 held by means of set screws 25 at each end of the sleeve 18 cooperate to prevent the sleeve from moving endwise on its support. The curved outer shoe 23 is provided with a helical spring 26 which has its ends fixed in the opposite ends of the shoe 23 and to one end of which is secured a conductor 27. Another conductor 28 is fastened by means of a binding post or the like 29 to the bracket 11 and the conductors 27 and 28 are connected to an induction coil and vibrator 30 and 31 which are supplied with current from a battery 32 or other source of electrical energy. A pin 33 in the shoe 23 engages the spring 26 when the latter is pressed up in the shoe in the tire. 34 indicates a section of a tire in position between the lower and upper shoes.

In operation an automobile or other pneumatic casing is placed over the shoe 16 and the spring finder brought down into engagement with the outer surface of the tire, as shown in Fig. 2. The electrical current is then turned on and the tire is rotated. Any piece of metal embedded in the tire will cause a spark to jump from the spring finder through the nail 35 to the metal shoe. Likewise, if there is a hole in the tire caused by a puncture or the like and there is no metal present, the spark will jump through the hole left and indicate where the tire should be repaired. In this manner metal particles as well as holes in a tire can be easily located.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. A device for testing a tire comprising a shoe formed to fit on the inside of the tire in a manner to receive and support the same, an arm supporting said shoe, a bracket detachably supporting said arm, a bracket overlying the shoe, a flexible metallic coiled member adjustably carried by said last mentioned bracket, and means for supplying an electric current to the said shoe and flexible member, substantially as set forth.

2. A testing device comprising a rigid member for engaging one side of the device to be tested, a co-operating flexible metallic coiled member associated with the rigid member and adapted to engage and conform to the contour of the other side of the device tested, and means for supplying an electric current to the rigid and flexible members, substantially as set forth.

3. A device for locating punctures in automobile tire casings comprising a support, an upright post on said support, a horizontal arm supported at the top of said post, an insulated shoe on said arm movable toward and from the same, a flexible metallic coiled element mounted transversely of said shoe, a detachable metal conducting element shaped to conform to the interior of a tire casing, said last named element and flexible metallic coiled element being connected in a circuit with a source of high-potential current, substantially as set forth.

4. A device for locating punctures in automobile tire casings comprising a support, an upright post on said support, a horizontal arm supported at the top of said post, an insulated shoe on said arm movable toward and from the same, a flexible metallic coiled element mounted transversely of said shoe, said element having its ends firmly embedded in said insulated shoe, a detachable metal conducting element shaped to conform to the interior of a tire casing, said last named element and flexible metallic coiled element being connected in a circuit with a source of high-potential current, substantially as set forth.

In witness whereof, I have hereunto set my hand at Indianapolis, Indiana, this 8th day of March, A. D. nineteen hundred and twenty-eight.

EDWARD R. DYE.